US007103211B1

(12) United States Patent
Medioni et al.

(10) Patent No.: US 7,103,211 B1
(45) Date of Patent: Sep. 5, 2006

(54) METHOD AND APPARATUS FOR GENERATING 3D FACE MODELS FROM ONE CAMERA

(75) Inventors: Gérard G. Medioni, Los Angels, CA (US); Bastien Pesenti, Campbell, CA (US)

(73) Assignee: Geometrix, Inc., San Jose, CA (US)

( * ) Notice: Subject to any disclaimer, the term of this patent is extended or adjusted under 35 U.S.C. 154(b) by 746 days.

(21) Appl. No.: 10/236,020

(22) Filed: Sep. 4, 2002

Related U.S. Application Data

(60) Provisional application No. 60/317,019, filed on Sep. 4, 2001.

(51) Int. Cl.
*G06K 9/00* (2006.01)
(52) U.S. Cl. ...................... 382/154; 382/118
(58) Field of Classification Search ................ 382/118, 382/154
See application file for complete search history.

(56) References Cited

U.S. PATENT DOCUMENTS 6,072,496 A * 6/2000 Guenter et al. ............. 345/419

OTHER PUBLICATIONS

Licheng Liu, Zhengyou Zhang, Chuck Jacobs, Michael Cohen, Rapid Modeling of Animated Faces From Video, Feb. 28th 200, Microsoft Research, MSR-TR-2000-11, 1-21.*

* cited by examiner

*Primary Examiner*—Joseph Mancuso
*Assistant Examiner*—Jonathan Schaffer
(74) *Attorney, Agent, or Firm*—Joe Zheng

(57) ABSTRACT

Techniques for generating a fully-textured 3D model of a human face are disclosed. According to one aspect of the present invention, a fully automatic system is configured to generate a 3-D model from a sequence of images that are produced from a single camera when a user is moving his/her head steadily from one direction to another, for example, from the left side of the camera to the right side of the camera. The images are processed in a two-stage process. First, the camera pose information is estimated for each of the valid image frames. Second, a mesh model is generated with respect to the camera pose information, and subsequently is textured with reference to one or more of the image frames.

22 Claims, 26 Drawing Sheets

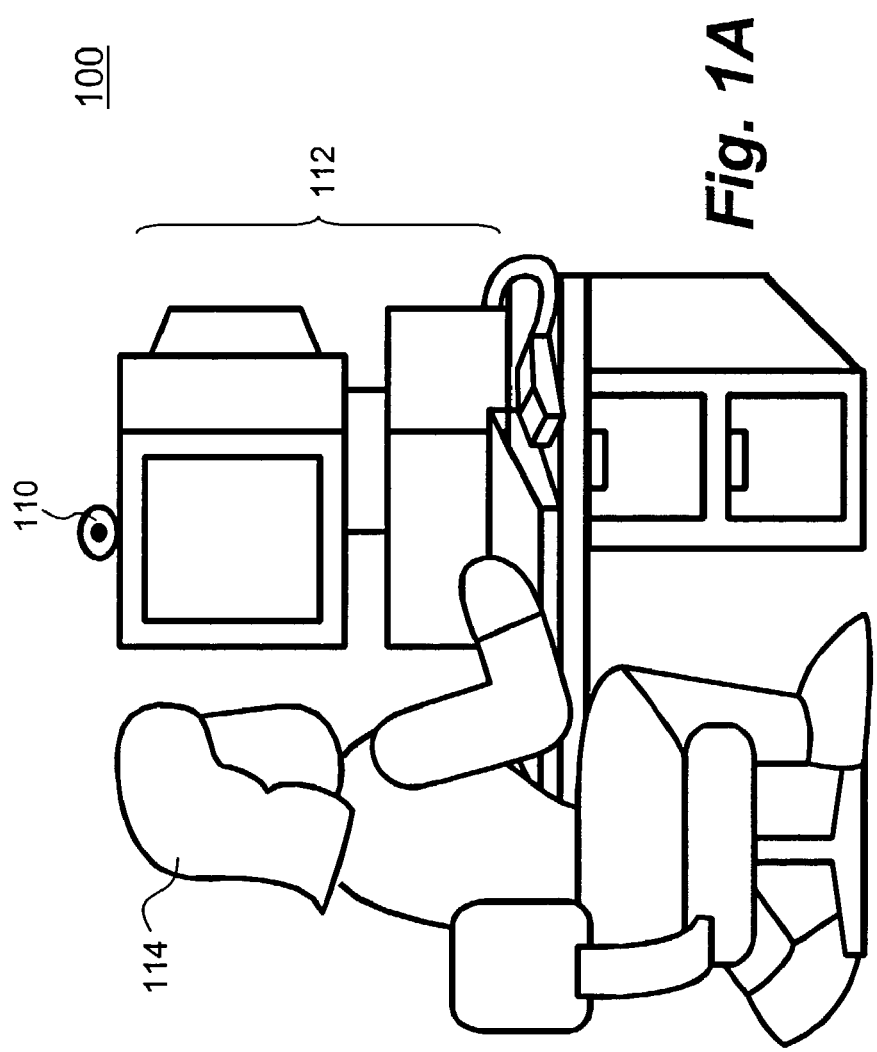

METHOD AND APPARATUS FOR GENERATING 3D FACE MODELS FROM ONE CAMERA

CROSS-REFERENCE TO RELATED APPLICATION

This application claims the benefits of the provisional application, No. 60/317,019, filed Sep. 4, 2001, entitled "One Camera Face Capture", which is hereby incorporated by reference for all purposes.

BACKGROUND OF THE INVENTION

1. Field of the Invention

The present invention generally relates to 3-dimensional (3D) scanning of the human face and more particularly relates to a method and apparatus for generating a fully textured 3D model of a human face using a single camera.

2. Description of the Related Art

Many applications require the use of a 3D face model. The generation of a fully textured 3-D model of a person's face presents difficult technical challenges, but has many applications in several fields, such as video games, immersive telepresence, and medicine. For instance, players in an interactive game may want to see their own face on the body of their hero. Facial animation and e-mail delivery by an avatar is an interesting use of a 3D face model (see Reference 1 or Reference 2). Another example is demonstrated in the "Virtual Try-On" of eyeglasses in 3-D (See Reference 3).

One of the critical components for these applications is the 3-D model acquisition phase. Active methods proceed by projecting laser (See Reference 4), infrared, or other patterns on the face to produce very good results, but the hardware required reduces their operational flexibility. The space carving methodology (Reference 5) has emerged from the use of regular cameras in the past. It seems appropriate, but it requires many sensors.

Methods using two cameras only (Reference 6) have recently become popular and were seen at various trade shows, such as Siggraph 2000. In addition, Pascal Fua (Reference 7) has built a system to reconstruct faces from video sequences, with an un-calibrated camera. The approach is based on a regularized bundle adjustment, and makes extensive use of a generic 3-D face model. This enables the recovery of the motion information. The final model is built by deforming the generic model. Zhengyou Zhang (see Reference 8) has also demonstrated a system to build a three dimensional model, using a single web cam to capture images. The 3-D model has further been integrated with a number of other elements, such as a text to speech animation module, to produce a complete animation-ready head. Zhang extracts 3-D information from one stereo pair only, then deforms a generic face model. Camera poses are computed for the rest of the sequence, and used to generate a cylindrical texture.

The major drawbacks of such systems are the cost of the hardware they require, or the lack of operational flexibility, or a generic look-a-like of the reconstructed models when computed by deforming a model. In addition, these methods may fail to reconstruct artifacts like beards or moustaches. There is therefore a need for generic approaches to generate a fully textured 3D face model using a single camera.

List of References Cited in the Above Section

Reference 1: Eyematic "Eyematic Expression", www.eyematic.com/products_xpression.html, Inglewood, Calif.
Reference 2: LifeFX, "Life FX Stand in Technology" www.lifefx.com/FaceOfTheInternet/product.html, Boston, Mass.
Reference 3: Geometrix Inc, "FaceVision" www.geometrix.com/Facevision, San Jose, Calif.
Reference 4: CyberWare, "Head & Face Color 3D Scanner Bundle", www.cyberware.com, Monterey, Calif.
Reference 5: N. Kutulakos, S. Seitz, "A Theory of Shape by Space Carving", *IJCV*, (38), No. 3, pp. 197–216, July 2000.
Reference 6: G. Medioni, Q. Chen, "Building 3-D Human Face Models from Two Photographs", *The Journal of VLSI Signal Processing*, Kluwer Academic Publisher, pp 127–140, 2001. Reference 7: P. Fua. "Regularized Bundle-Adjustment to Model Heads from Image Sequences without Calibration Data", *International Journal of Computer Vision*, 38(2), pp 153–171, July 2000.
Reference 8: Z. Liu, Z. Zhang, C. Jacobs, M. Cohen, "Rapid modeling of animated faces from video", *Journal of Visualization and Computer Animation*, 12(4), pp 227–240, 2001.

List of References Incorporated hereby by Reference

Reference 9: OpenCV, "The Open Source Computer Vision Library."—www.intel.com/research/mrl/research/opencv/
Reference 10: L. Shapiro, R. Haralick. "Image Matching—An Interest Operator", *Computer and Robot Vision Volume II*, pp 341–343, October 1992, Prentice Hall.
Reference 11: Jianbo Shi and Carlo Tomasi. Good Features to Track. IEEE Conference on Computer Vision and Pattern Recognition, pages 593–600, 1994.
Reference 12: M. Fischler and R. Bolles, "Random Sample Consensus: A Paradigm for Model Fitting with Applications to Image", *Communications of the ACM*, pp 381–395, June 1981.
Reference 13: J. J. Koenderink, A. J. van Doorn, "Affine Structure From motion", J. Optical Soc. Am. pp 377–385, 1991.
Reference 14: B. Triggs, P. McLauchlan, Richard Hartley and Andrew Fitzgibbon. "Bundle Adjustment—A Modern Synthesis", *Workshop on Vision Algorithms*, pp 298–372, 1999
Reference 15: Photo Modeler Pro—www.photomodeler.com, EOS Systems Inc.

SUMMARY OF THE INVENTION

The present invention pertains to techniques for generating fully-textured 3D model of a human face. According to one aspect of the present invention, a fully automatic system is configured to generate a 3-D model from a sequence of images taken by a single camera. Different from prior art systems, the present invention does not depend on a generic 3-D face subject to deformation, but instead proceeds in a fully bottom-up fashion. One of the advantages in the present invention is a modeling mechanism that can be easily deployed, for example, in a home computer with a web camera to generate a fully-textured 3D model of a user's face.

According to another aspect of the present invention, a sequence of image frames are generated by the single camera while a user is moving his/her head steadily from one direction to another, for example, from the left side of the camera to the right side of the camera. With the image frames, a computing device loaded with an executable version of the present invention that is configured to proceed with a two-stage process. First, it estimates for each view the pose of the face with respect to the camera. This is accomplished by feature matching and global bundle adjustment. Then, sets of adjacent views are considered as stereo pairs, and partial depth maps thereof are generated and then integrated into a single 3D mesh. Alternatively, a 3D mesh is generated incrementally from the camera poses and triangulated by the feature points. Subsequently, the 3D mesh is textured with respect to one or more of the image frames.

According to one embodiment, the present invention is a method for generating a fully-textured 3D model of a human face, the method comprises generating a sequence of images from a camera while the human face rotates from one direction to another direction in front of the camera; determining a foreground and a background in each of the image, the foreground occupied by the human face and thus changing from one to another in the sequence of the images; extracting features located in the foreground of each of the images; determining camera pose information for each of the image frames; generating a 3D mesh model in accordance with the camera pose information; and texturing the 3D mesh model with respect to one or more of the images.

According to another embodiment, the present invention is a system for generating a fully-textured 3D model of a human face, the system comprises a computing device; a single camera coupled to the computing device and generating a sequence of images while the human face rotates from one direction to another direction before the single camera; and wherein the computing device is configured to perform operations of: receiving the images from the camera; determining camera pose information for each of the image frames; generating a mesh model of the human face in accordance with the camera pose information; and texturing each of polygons in the mesh model with respect to one or more of the images.

According to still another embodiment, the present invention is a software product for generating a fully-textured 3D model of a human face, the software produce comprises program code for receiving a sequence of images from a camera, the image being produced while the human face rotates from one direction to another direction in front of the camera; program code for determining a foreground and a background in each of the image, the foreground occupied by the human face and thus changing from one to another in the sequence of the images; program code for extracting features located in the foreground of each of the images; program code for determining camera pose information in each of the images; program code for generating a 3D mesh model in accordance with the camera pose information; and program code for texturing the 3D mesh model with respect to one or more of the images.

Other objects, advantages and benefits together with the foregoing are attained in the exercise of the invention in the following description and resulting in the embodiments illustrated in the accompanying drawings

BRIEF DESCRIPTION OF FIGURES

These and other features, aspects, and advantages of the present invention will become better understood with regard to the following description, appended claims, and accompanying drawings where:

FIG. 1A shows an exemplary setting that may be used efficiently to generate a 3D model of a human face offline or on demand;

DETAILED DESCRIPTION OF THE PREFERRED EMBODIMENT

Figure 1B:
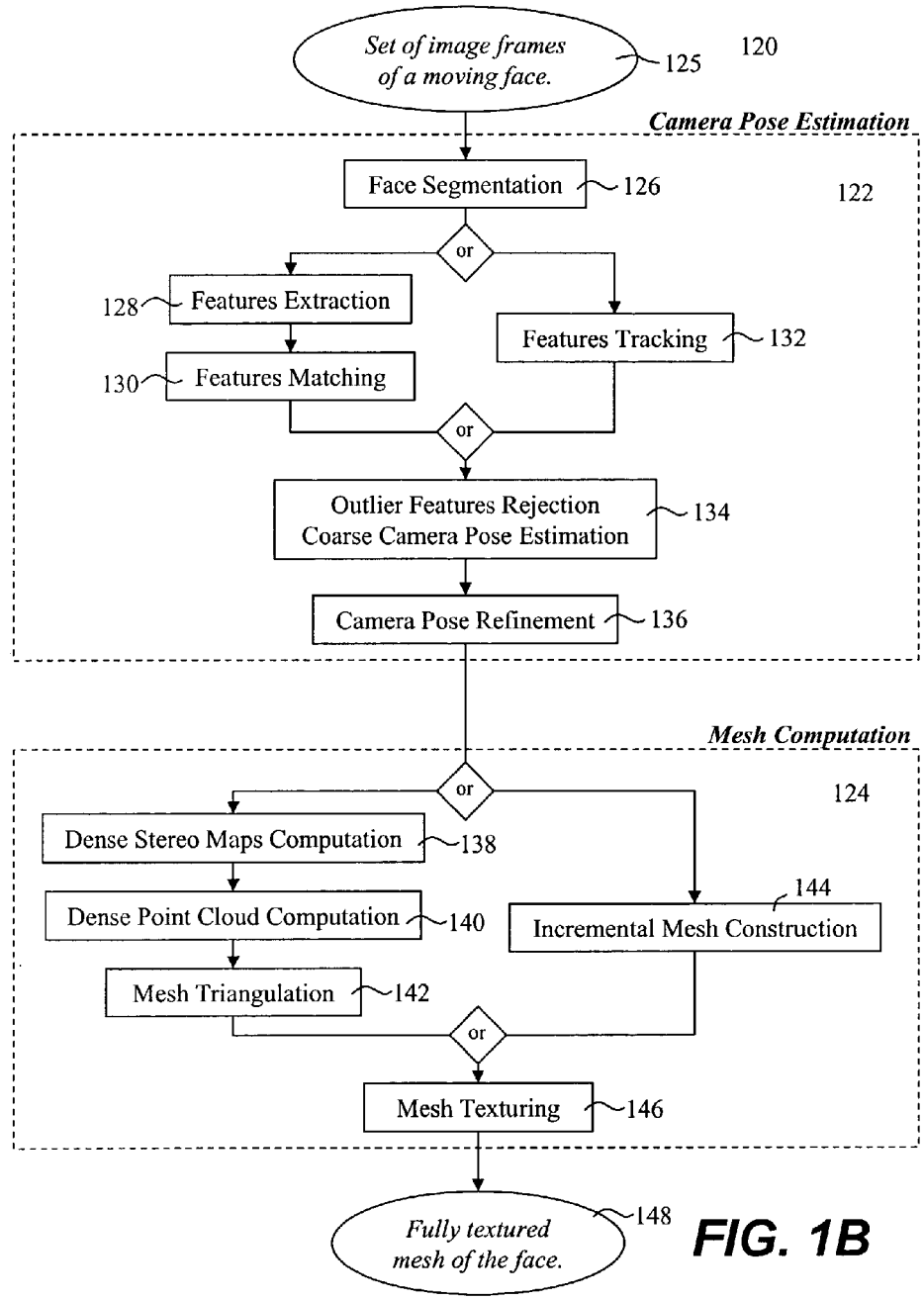
FIG. 1B shows a block diagram with two functional blocks, one producing refined camera pose information used to capture a sequence of image frames of a human face, the other producing a textured model based on a mesh model of the human face.

The present invention pertains to techniques for generating fully-textured 3D model of a human face using a single camera. A user who desires to generate a 3D model of his/her face needs only to rotate his/her head in front of the camera that produces a sequence of image frames. The image frames are provided to a computing device that is loaded with an executable module of the present invention. The executable module is configured to proceed with a two-stage process. First, the pose of the face in each of the image frames is estimated with respect to the camera. This is accomplished by feature matching and global bundle adjustment. Then, two adjacent views are treated as a stereo pair and used to generate partial depth maps that are then integrated into a single 3-D model. Alternatively, a 3D mesh is generated incrementally by triangulating the matched or tracked feature points, using the computed camera pose. Subsequently, the mesh is textured with reference to one or more of the image frames. One of the advantages in the present invention is a modeling mechanism that can be easily deployed, for example, in a home computer with a web camera to generate a fully-textured 3D model of a user's face.

The detailed description of the present invention is presented largely in terms of procedures, steps, logic blocks, processing, or other symbolic representations that directly or indirectly resemble the operations of optical devices or systems coupled to optical networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments.

To facilitate the description of the present invention, it deems necessary to provide definitions for some terms that will be used throughout the disclosure herein. It should be noted that the definitions following are to facilitate the understanding and describe the present invention according to an embodiment. The definitions may appear to include some limitations with respect to the embodiment, the actual meaning of the terms has applicability well beyond such embodiment, which can be appreciated by those skilled in the art:

Face or human face: a real face of a human being who can rotate his/her face in front of a camera for scanning, preferably, the expression of the face remains substantially same.

Fully textured model: a 3D model of the scanned face, fully textured and processed as obtained when scanned and computed by an embodiment of the present invention, generally, the model can be rotated a certain degree.

Image frame: a picture of the scanned face, part of the sequence of images presented as input to the present invention.

Sequence of image frames: a number of successive images from a camera.

Segmentation of an image frame: separation of the area covered by a scanned face in an image from the remaining part of the image.

Feature points: points in an image frame representing a particular point of interest on a person's face.

Feature motion path: estimated motion path of a feature point on different image frames or in a 3D space.

Inlier Match: pair or set of feature points on different image frames that represent the same physical 3D point on the person's face.

Outlier Match: pair or set of feature points on different image frames that represent different physical 3D points on the person's face.

Camera Pose: set of estimated 3D positions of the camera that captures the sequence of image frames relative to the spatial position of the person's face.

Dense Stereo Map: map that associates points representing the same physical 3D point on the person's face in two different image frames.

To Triangulate (when used for a pair of 2D points or a set of 2D points): computing the location of a 3D point using two (or more) corresponding points in two (or more) different image frames.

To Triangulate (when used for a cloud of 3D points): adding topological information to the cloud of 3D points, i.e. transforming the cloud of points (also designed as vertices) into a meshed surface.

Point Cloud: set of 3D points representing in a virtual 3D space the surface of the person's face.

Mesh: point cloud with topological information, i.e. meshed surface in virtual 3D space that represent the person's face.

Coarse Mesh: low detailed mesh build only using feature points.

Embodiments of the present invention are discussed herein with reference to FIGS. 1A–12E, in which like numerals refer to like parts throughout the several views. However, those skilled in the art will readily appreciate that the detailed description given herein with respect to these figures is for explanatory purposes as the invention extends beyond these limited embodiments.

FIG. 1A shows an exemplary setting 100 that may be used efficiently to generate a 3D model of a human face offline or on demand. A camera 110 is coupled to a computing device 112 that may be coupled to the network. In particular, the computing device is loaded with a 3D modeling module implementing the present invention. The 3D modeling module, when executed, generates a 3D model of a human face 114. In operations, the human face 114 is positioned before the camera 110. While the human face 114 is rotated, for example, from left to right, a sequence of image frames are produced from the camera 110. The image frames are provided to the computing device 112 in which the 3D modeling module is configured to generate a fully-textured 3D model of the human face 114.

According to one embodiment of the present invention, FIG. 1B shows a block diagram 120 with two functional blocks 122 and 124. Inside each block 122 or 124, various techniques to achieve specific purposes are presented. Those skilled in the art can appreciate that a few possible combinations of the techniques are possible, each combination is essentially a different numerical method but solves one or more substantially similar problems in order to achieve the purposes. Since many of the techniques used in FIG. 1B are known in the art, to avoid obscuring aspects of the present invention, some techniques will be briefly described and a corresponding reference is provided for a detailed description thereof, wherein the corresponding reference is hereby incorporated by reference.

A single camera, such as the one 110 in FIG. 1A, produces a sequence of image frames of a head in motion (i.e., moved from one direction to another). To get a better model of a face, the head of a user should be totally visible in an image. It is preferable that the facial expression of the face remains unchanged during the image capturing of the face. In general, the internal calibration of the camera is pre-performed prior to the capturing of the image frames, the calibration of the camera is a well known subject in the art. The detailed description of such calibration is provided as part of the OpenCV library (see Reference 9). The values of internal optical characteristics make it possible to model the camera for numerical computation as a finite projective camera. In one embodiment, the image frames are respectively rectified for possible camera radial lens distortion.

Figure 2A:
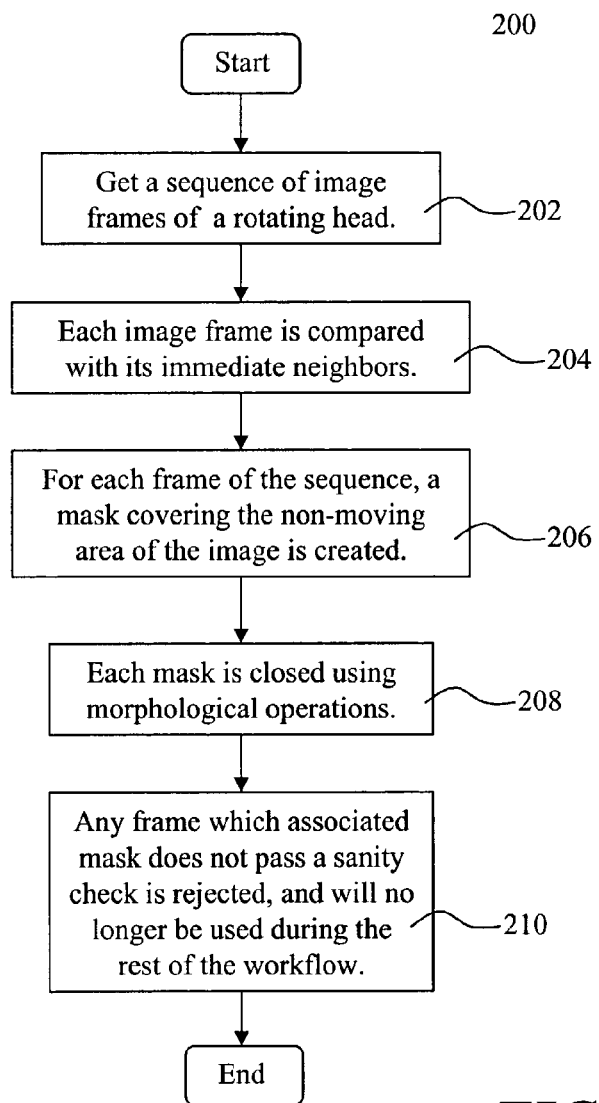
FIG. 2A shows a process of segmenting a sequence of images.

FIG. 2A shows a process flowchart 200 of segmenting a sequence of images. The process 200 may be used to implement block 125 and 126 of FIG. 1. During the capture of the sequence of images at 202, the camera is at a fixed position in space. While the face is rotating, the background is immobile and in the consistent rigid world of the camera. Essentially, the face is the only object moving from one image to the other. An image motion detection technique can be used to compare two adjacent image frames in the sequence and the area covered by the face can be well approximated.

Figure 2B:
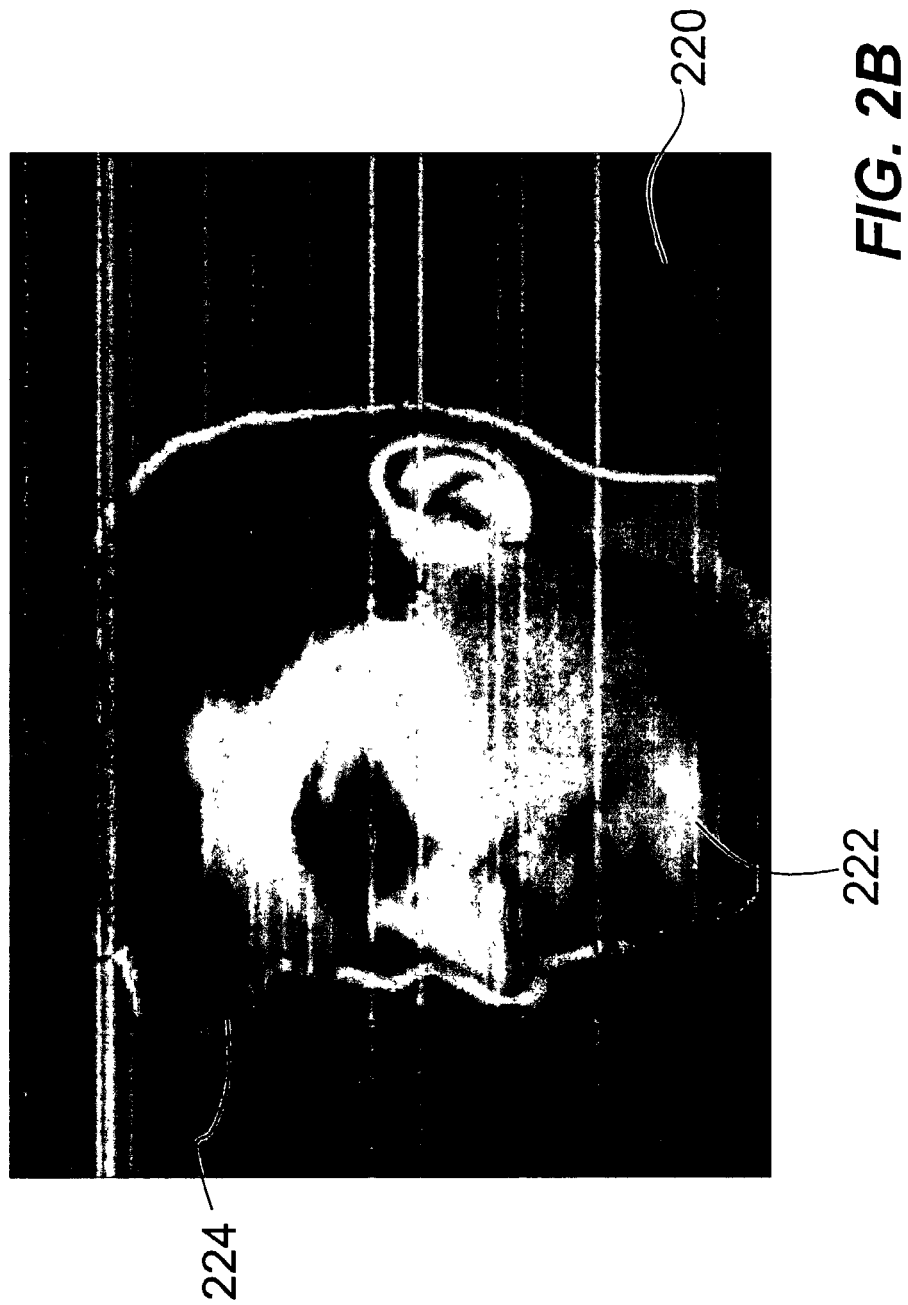
FIG. 2B shows a face segmented from the background in one of the image frames.

According, two immediate neighbor images are compared at 204. Variations of luminance and color are measured. When a large difference appears, the pixel is identified as representing a moving part of the captured scene, thus it is most likely belonging to the person's face. At 206, a mask of the image is created with a value of "1" (true) for a moving point of the face and "0" (false) for a point of the background. The masks are then closed using a dilatation-erosion technique at 208. The masks borders are generally accurate only to a few pixels, which suits our needs. FIG. 2B shows a valid mask (a superimposed color 220) segmenting the face 222 from the background 224. During the remaining part of the workflow, these masks will enable us to identify features tracked on the face and reject features detected on the background. Any computed 3D face points will be validated using back projection on any of the feature frames, as it should belong to the segmented face area of the face.

A sanity check on the masks is performed at 210. In general, the masks should cover a sufficient area of the image, and are likely to be the projection of the shape of the face on a 2D picture. Any image frame whose mask does not satisfy these conditions is rejected from the sequence. In principal, the images captured at the beginning or the end of the sequence where no motion occurs will be rejected.

Figure 3A:
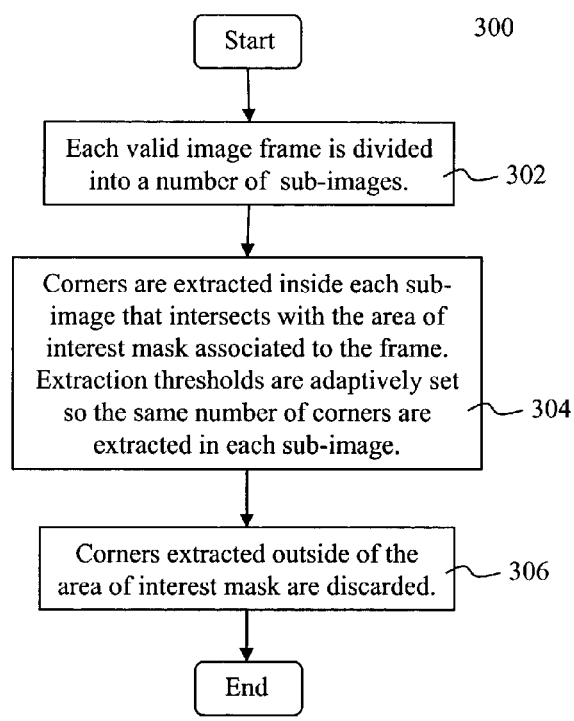
FIG. 3A shows a process flowchart of extracting features in the image frames.

FIG. 3A shows a process flowchart 300 of extracting features in the image frames. The process 300 may be used to implement block 128 of FIG. 1B. The purpose of process 300 is to identify features of the person's face that can be matched in order to compute the three-dimensional motion of the head in space.

A typical face of a person contains only a few number of corners, the surface of the face is largely smooth with few irregularities. Locations with a significant color or intensity change are rare, and not equally distributed in the face image. However, in order to get pose estimation information, later in the computation out of the extracted features, the features shall be of sufficient number, and reasonably distributed across the face surface.

Figure 3B:
FIG. 3B shows feature points extracted on the face area of one of the image frames

According to one embodiment, an image frame is subdivided into small regions at 302. Each of the regions is analyzed for brightness and contrast information at 304. A Plessey corner extractor which is a derivative filter of the first order (see Reference 10) is initialized to detect a pre-defined number of features under the conditions specific to the face area of the picture. For optimization reasons, only the areas inside the segmented face area of the picture are considered and others are discarded at 306. FIG. 3B shows features extracted on one of the image frames of the sequence. The extracted features associated with the valid views of the image frames are stored.

Figure 4A:
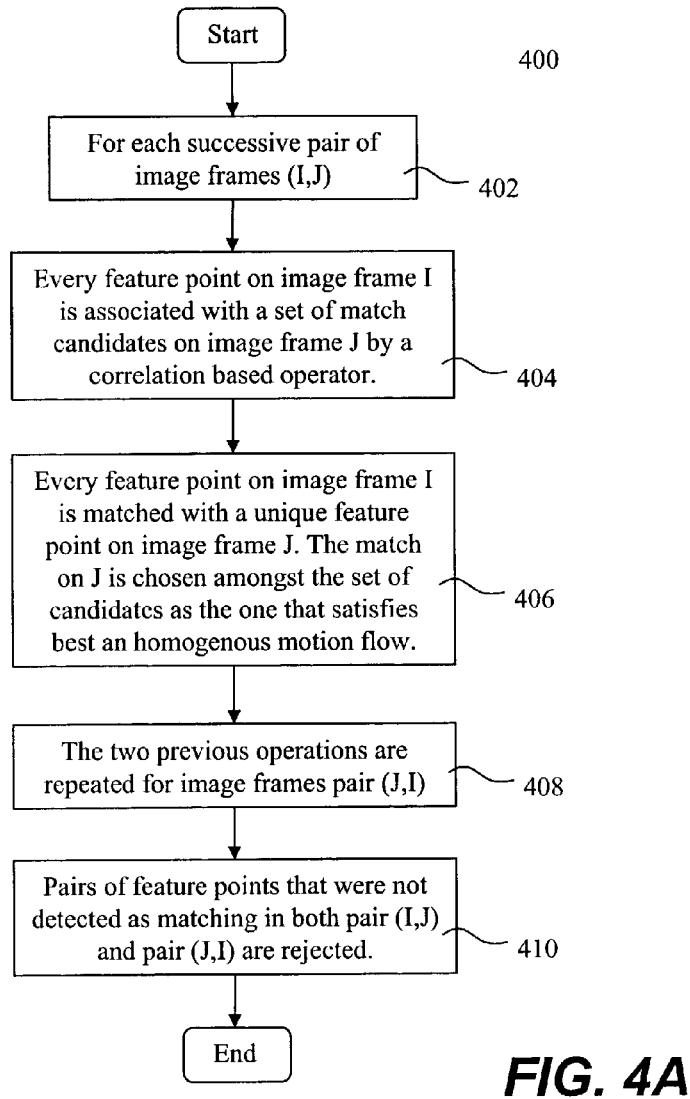
FIG. 4A shows a process flowchart of matching features in the image frames.

FIG. 4A shows a process flowchart 400 of matching features in the image frames. The process 400 may be used to implement block 130 of FIG. 1 and employs a correlation-based tool working at a pair wise level that also checks for neighborhood consistency. The feature matcher takes a pair of images, for example, image frames I and J, at 402, and a set of extracted features from one of the two pictures as input. It is run on every contiguous pairs of valid image frames of the sequence.

At first, a feature in image I may match a number of features in image J. We will call a point in I an initial point. The candidates are chosen in J within a certain distance from the location of the initial point in image I at 404. Successful candidates to the match are identified using a correlation operator, a well-known tool in image processing. The correlation operator analyzes the similarity of the image at the neighborhood of the feature points. A set of point in J, which neighborhoods are most similar to the initial point in I are retained.

Secondly, a graph is built, associating all extracted points in I to its possible match candidates in J. Points in J may be associated to several initial point in I. The graph is processed and only one match in J for each initial point in I is retained at 406. A point in J might still be associated with two points in I.

Figure 4B:
FIG. 4B shows motion vectors of features points matched on the second image frame of the pair.

The operation described in the two previous paragraphs is repeated at 408 inverting the role of I and J. The two-ways relationship between extracted feature points in I and J are super imposed. Only associations that were detected in both match process (I to J and J to I) are retained, while others are discarded at 410. FIG. 4B shows feature extracted (showed as crosses) and the motion path towards the location of their matches in the second image of the pair. As it is visible in FIG. 4B, some outliers are still present among the matches. Some of the outliers can be visually identified in the figure as their motion path is not consistent with the majority of the motion paths.

Figure 5A:
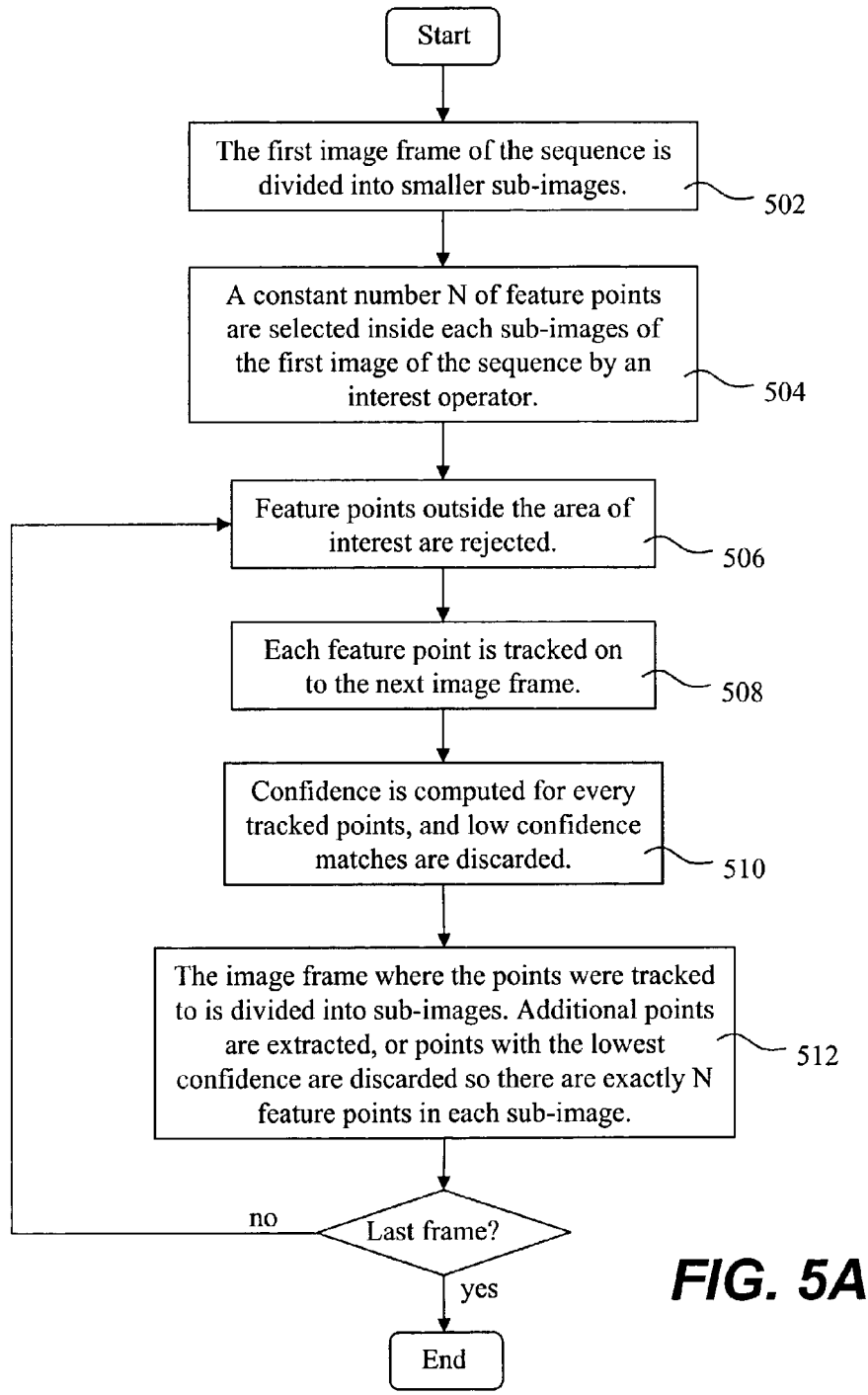
FIG. 5A shows a process flowchart of feature tracking.

FIG. 5A shows a process flowchart 500 of feature tracking. The process 500 may be used to implement block 132 of FIG. 1B and is an alternative to the Feature Extraction 132 and Feature Matching 130. At first, the first valid image frame of sequence is subdivided into smaller areas at 502 and feature points are extracted at 504. The feature extraction may be performed in the same way described in the process 300 of FIG. 3A. In one embodiment, a different operator is used to identify the features (see Reference 11). Features that would be extracted outside of the face segmented area, as obtained in Face segmentation 126 are discarded at 506.

Every extracted feature point of the first image frame is tracked into the second image frame at 508 using the method described in Reference 11. This method also gives a confidence value to all the tracked features at 510. We consequently discard all tracked feature points below a defined confidence threshold.

We ensure an equal repartition of the tracked features by subdividing the second image frame of the sequence into smaller sub-images at 512 in the same way it was done with the first image frame. We then assert that the same constant number of feature points is present within a sub-image. If the sub-image contains too many feature points, we discard the ones with a lower confidence rating. If, on the contrary, the sub image contains too few feature points, we apply the extractor operator used in the first frame to extract the missing features.

Figure 5B:
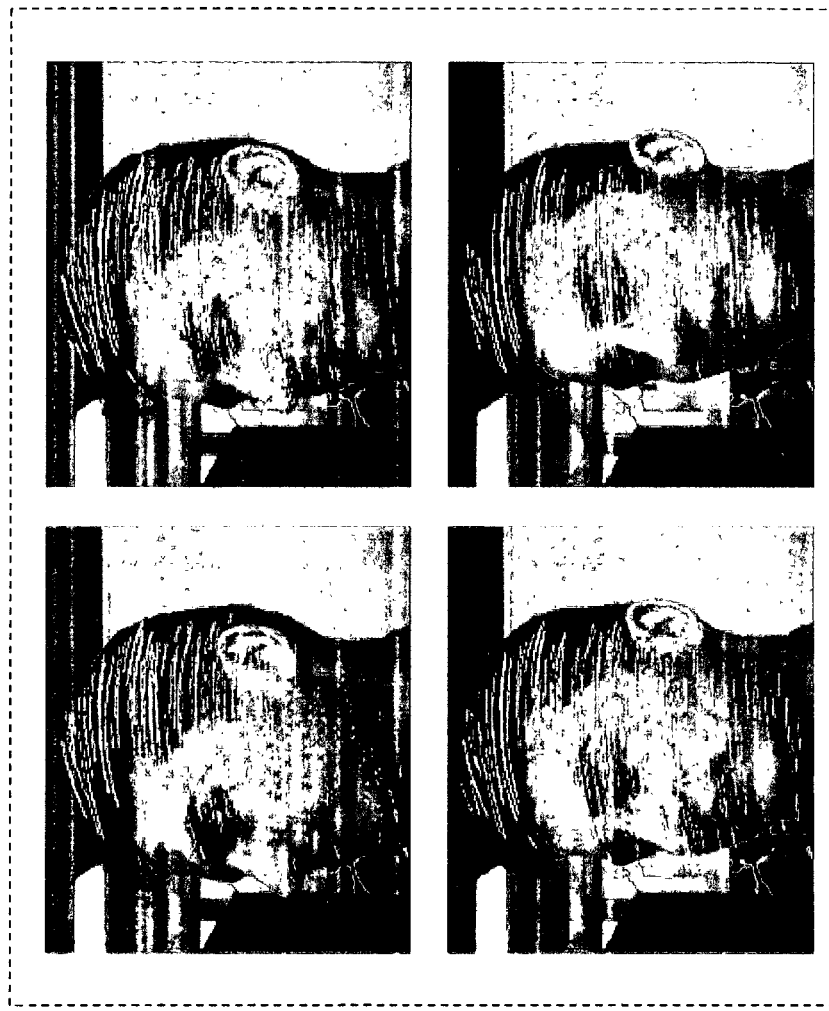
FIG. 5B shows tracked features and feature paths over four image frames of the sequence.

The process is then iterated on the successive pairs of image frames until the end of the sequence is reached. FIG. 5B shows tracked features (points) and tracked feature paths (curves) on four image frames.

Figure 6A:
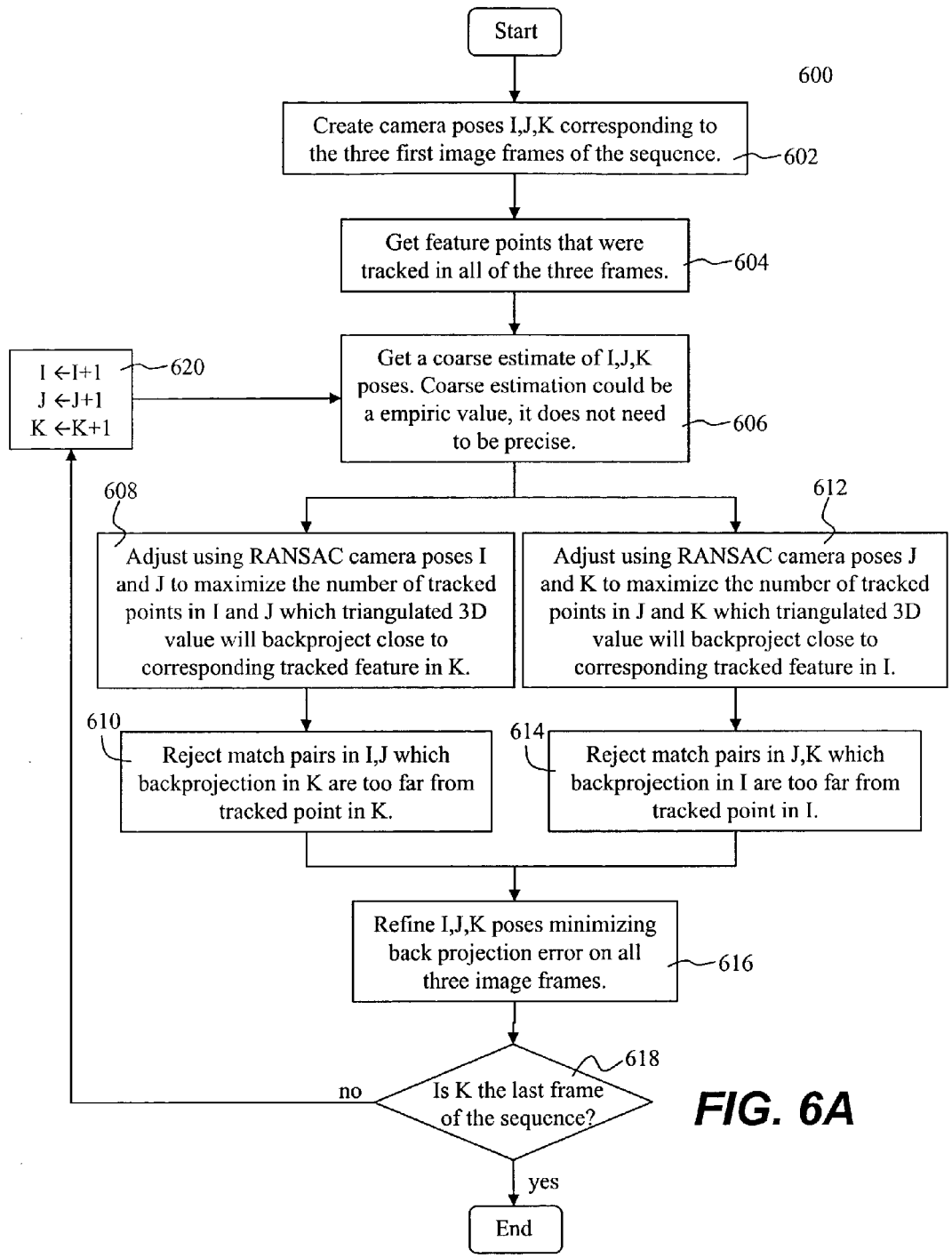
FIG. 6A shows a flowchart of processing outlier features rejection and coarse camera pose estimation.

FIG. 6A shows a flowchart 600 of processing outlier features rejection and coarse camera pose estimation. The process 600 may be used to implement block 134 of FIG. 1. One of the purposes of the process 600 is to determine a spatial system of camera poses from each of the valid image frames and feature points accurate enough to be used as an initial starting point for the non-linear bundle adjuster used in 700. According to one embodiment, a technique takes overlapping triplets of matched features in successive images as input, and computes a robust estimate of a rigid motion. The technique is performed with RANSAC (RANdom SAmple Consensus, see Reference 12).

Figure 6B:
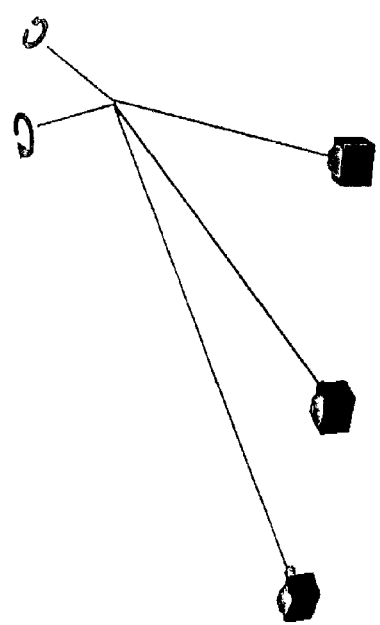
FIG. 6B shows the simplified pose adjustment of a left and right camera of a triplet, adjusted rotation axis and angles are visible for the left and right camera.

To gain speed and stability, we assume a simplified model of rigid motion as shown in FIG. 6B. For a triplet of image frames, the person's head is assumed rotating around a fixed center, whose projection in the image should fall within the region of interest.

At 602, a set of three image frames I, J, and K are obtained. The feature points are obtained at 604. The I, J, K poses are initialized to an empiric value at 606. To estimate the camera simplified posed, i.e. rotation around a fixed point, we use a special decomposition of the rotation transform proposed by Konderink and van Doom (see Reference 13). We decompose the rotation motion of the camera around the head into two basic rotations. First, a rotation around the camera principal axis and second, a rotation around an axis parallel to the image plane. Three angles, determining completely the rotation are estimated. $\theta$ is the angle of the rotation around the principal axis of the camera. $\phi$ represents the attitude of the complementary rotation axis, which is parallel to the image plane of the camera, and $\psi$ represents the amount of rotation around this axis. The rotation matrix of the camera can then be expressed as defined in Reference 13: $R=R_{\phi,\psi} \times R_\theta$.

Figure 6C:
FIG. 6C shows inlier (white or thin lines) and outlier (red or dark lines) matches in one image frame of the sequence.

The motion is estimated using a combination of RANSAC and non-linear least squares minimization. While adjusting the camera motion, inlier feature point matches are identified, and outlier feature matches are discarded. Inlier and outlier matches are depicted in FIG. 6C. The convergence of the estimation criterion is the back projection error of tracked features of two adjusted camera poses on the remaining frame. This back projection error happens to be most sensitive to variations in $\theta$, $\phi$ and then $\psi$. We therefore decompose the estimation of the rotation in two major steps. First, $\theta$ and $\phi$ are roughly estimated using two image frames only. The $\theta$ and $\phi$ component of the pose of I relative to J is estimated at 608. In one embodiment, the residual error that is minimized during this estimation is the distance between the tracked features in K and the back projection of their corresponding 3D point triangulated from I and J. The same component of the pose of K relative to J is estimated at 612. At 610 and 614, feature matches that do not fit the estimated motion model between camera poses are rejected as outliers. $\psi$ is estimated as a second pass at 616, while $\theta$ and $\phi$ are refined as well. However, the impact of a variation about $\psi$ on the back projection error is small. For this reason, it is necessary to work on a triplet of frames at 616. We thus can use a cross back projection error, estimating the impact of the motion between frame one and two as a back projection error on frame three. According to one embodiment, two different motions are estimated in the same time.

As shown at 618 and 620, each contiguous overlapping triplet is estimated. Each triplet pose, the first set aside, is initialized using the previous estimation. It therefore asserts continuity of movement.

Figure 7A:
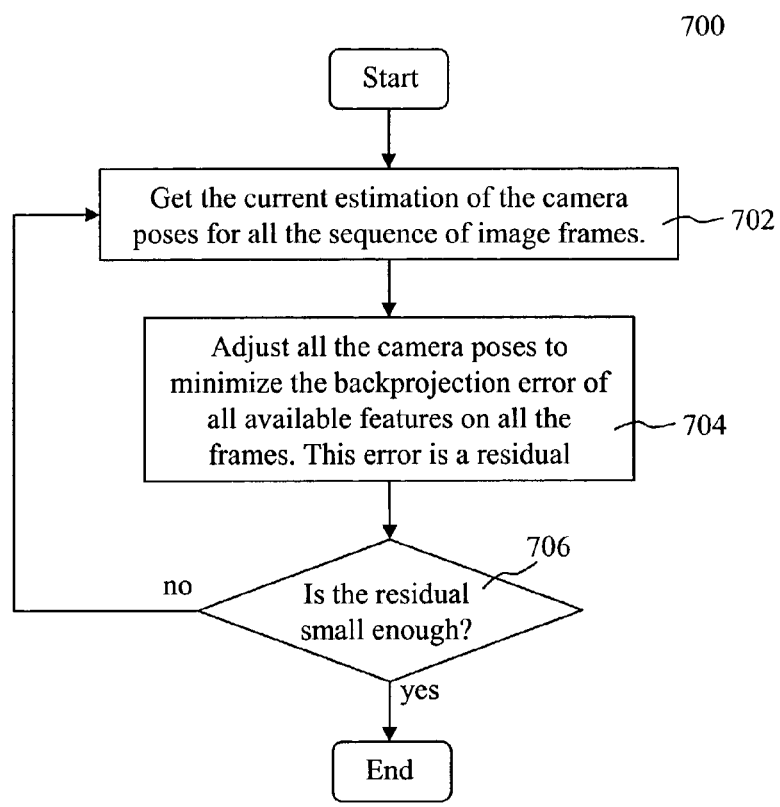
FIG. 7A shows a process flowchart of refining camera pose.

FIG. 7A shows a process flowchart 700 of refining camera poses. The process 700 may be used to implement block 136 of FIG. 1B. At 702, the estimation of the camera poses (i.e., camera pose information) for all the image frames is obtained (e.g., from the process 600 of FIG. 6A). The estimated camera poses are adjusted to minimize the errors of all available features in all the frames at 704. According to an embodiment, the coarse estimated system 134 of FIG. 1B is passed to a non-linear bundle adjuster (see Reference 14), which is a classical photogrammetry package (see Reference 15). This bundle adjuster uses the filtered feature matches (See FIG. 6C), which no longer contain outliers, in order to precisely position the cameras in space. The roughly estimated camera poses computed in the previous step are entered as the starting point of this non-linear estimation.

Figure 7B:
FIG. 7B shows the camera poses adjusted in 3D, as well as the tracked (or matched) feature points triangulated in 3D.

The bundle adjustment then iterates until it reaches a predefined precision, which is a function of the back projection error for the 3D features. It does not make any assumption about a simplified model of motion, unlike what was done in the previous steps. It will therefore precisely position the cameras, as shown in FIG. 7B. Convergence to the correct solution depends mostly on the fact that all outlier matches are rejected in the previous step. Tests on a turntable sequence have proven the camera pose accurate within 0.3 degrees.

Figure 8A:
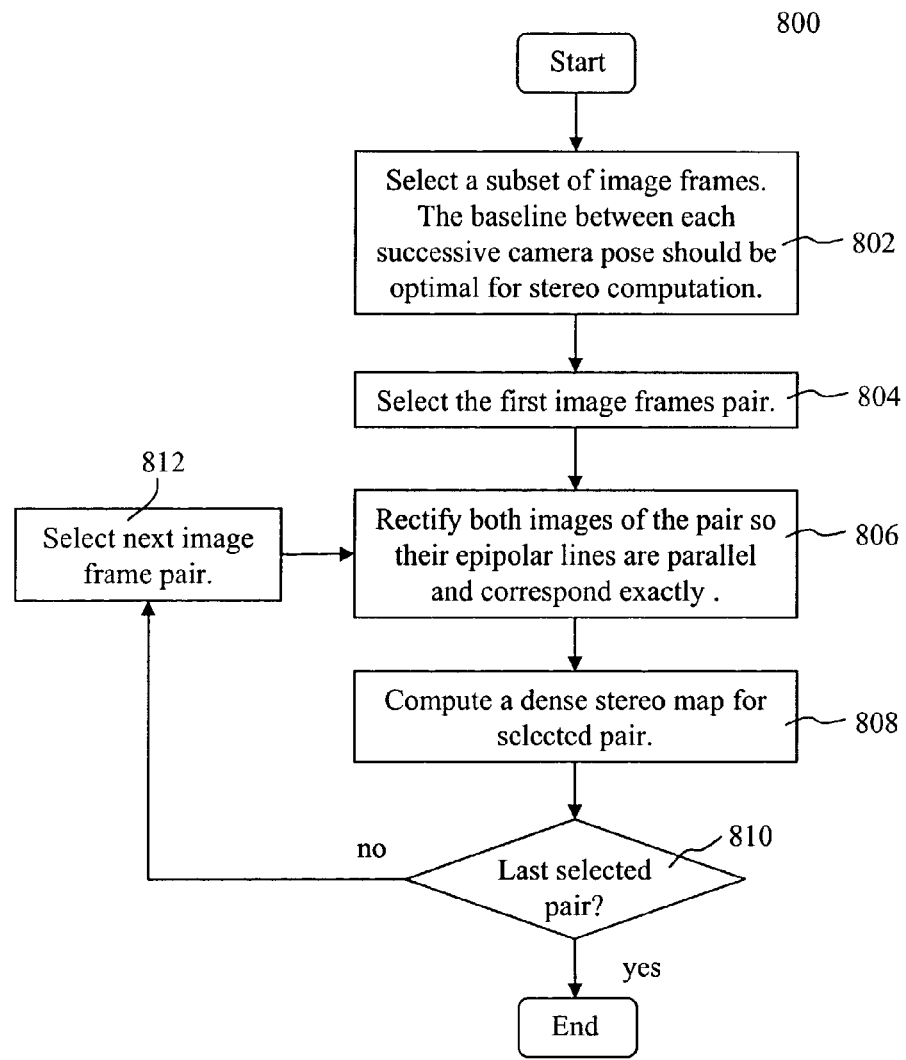
FIG. 8A shows a process flowchart of performing dense stereo maps computation.
Figure 8B:
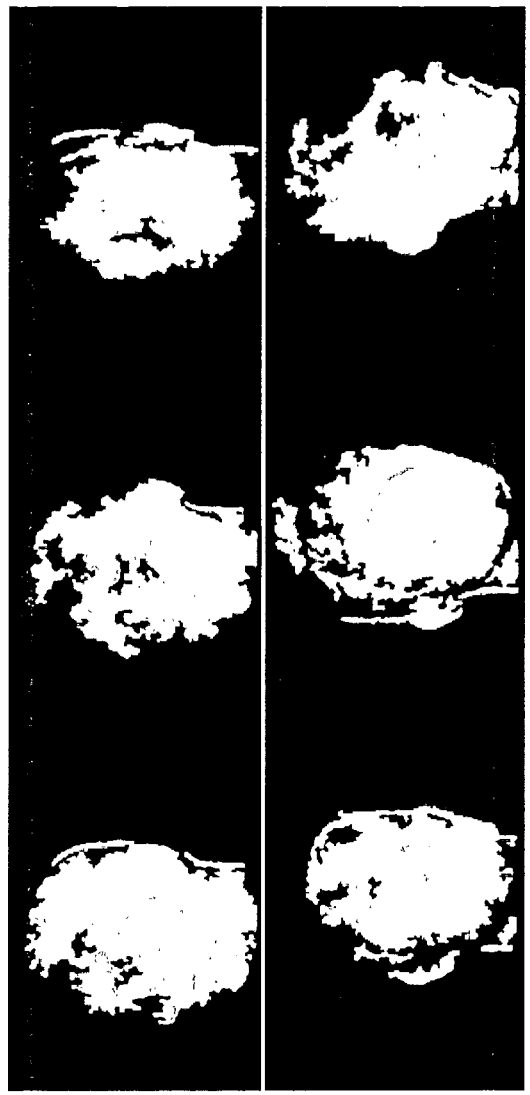
FIG. 8B shows six stereo maps corresponding to seven successive image frames of the sequence.

FIG. 8A shows a process flowchart 800 of performing dense stereo maps computation. The process 800 may be used to implement block 138 of FIG. 1B. At 802, a subset of image frames are selected at 802 with a condition that the baseline between the successive camera poses obtained from the selected image frames shall be optimal for stereo computation. From the selected image frames, a first pair (two adjacent image frames) are selected at 804. Then, at 806, the images are rectified so their respective epipolar lines are parallel to each other, and correspond to scan lines. This can be achieved easily as we now know the relative two positions of the camera. A disparity is then assigned to each pixel, describing the position of its corresponding feature in the other image. The computation of the dense disparity map proceeds by a low-resolution correlation search, followed by a multilevel propagation and refinement. Additional description of the computation or the algorithm is available in Reference 6. At 810, a decision is made if each of the selected group of image frames has been computed. If not, the process 800 goes to 812 for a next pair of image frames. FIG. 8B shows that points closer to the camera appear darker on the disparity map.

Figure 9A:
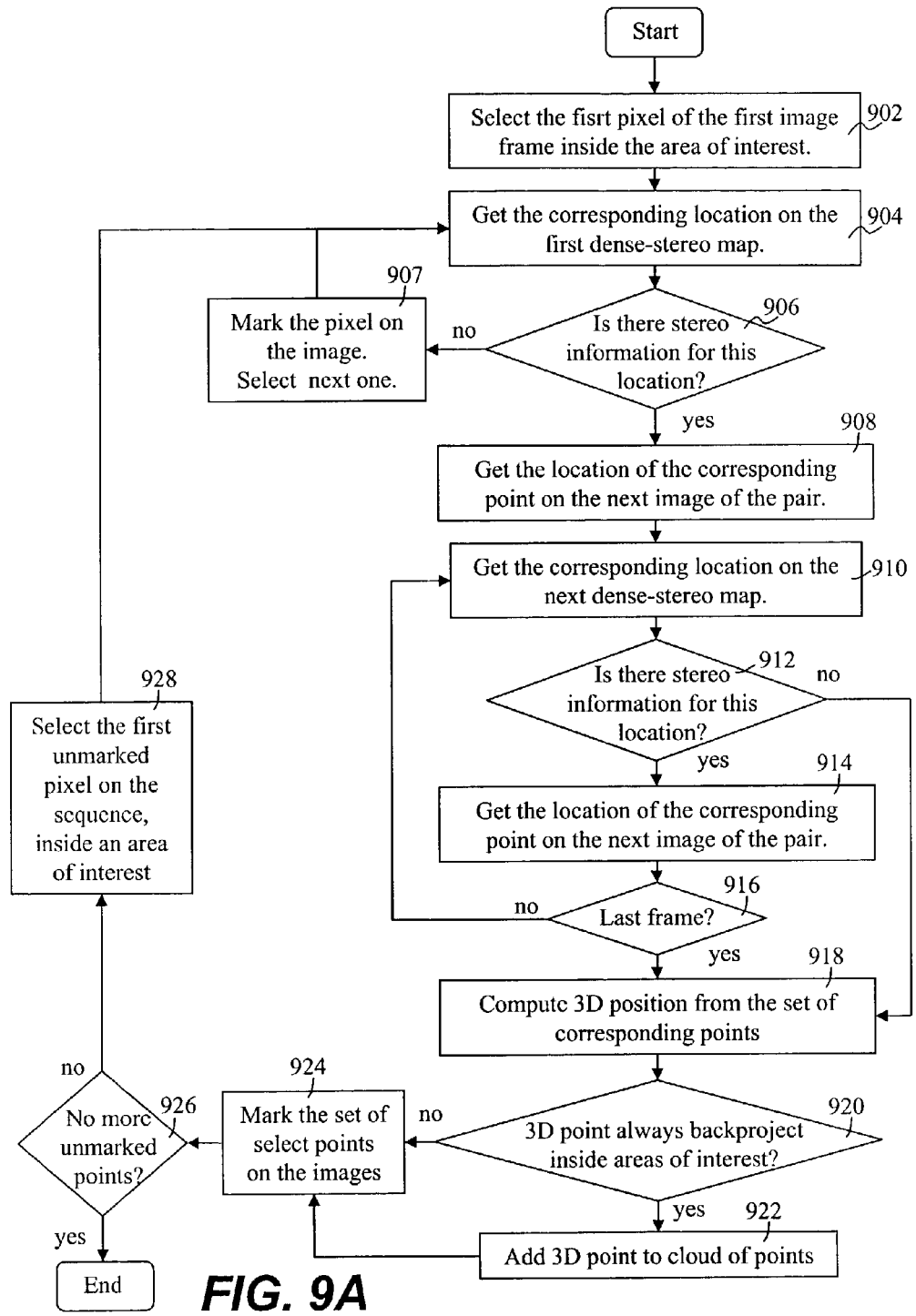
FIG. 9A shows a process flowchart of performing the computation of the cloud of points.

FIG. 9A shows a process flowchart 900 of performing dense point cloud computation. The process 900 may be used to implement block 140 of FIG. 1B. One of the objectives in the process 900 is to express the information contained in the dense stereo maps in a three dimensional space. Dense stereo maps provide correspondence information between successive image frames. Since the camera poses are known for all the valid image frames of the sequence, corresponding 2D points can be triangulated into 3D. Accordingly, the process 900 processes every set of known corresponding points in the sequence of image frames, triangulate the points into a 3D space and reject those detected as inaccurate.

It is assumed that (I1,I2) is the first pair of image frames of the sequence. Let D1 be the first dense stereo map of the sequence of stereo maps computed in Dense Stereo Maps Computation.

At 902, we consider the first pixel p(I1) of the segmented face area inside I1. At 904, we read in D1 the location of the point p(I1) in I2 corresponding to the pixel we selected. As stereo correspondents, the two points are actually matches and show the same physical feature of the person's face. At 906, if no information is contained in D1 for this, we mark the pixel in I1 as processed at 907 and iterate with the next pixel, until information is available inside the dense stereo map.

Now knowing at 908 the location of p(I2), we look at 910 into the second dense stereo map D2 the location of the corresponding point p(I3) inside the third image frame I3. We iterate the process until whether we cannot find a correspondent because there is no valid stereo information inside a dense stereo map (no at 912), or we reach the last frame of the sequence and there are no more correspondences to be searched (yes at 916).

At 918, we have a set of corresponding points (p(I1), p(I2), . . . , p(IN)). These points are feature matches, meaning they correspond to the same physical feature on the person's face. We now triangulate this set of point into a 3D point. This point will be on the surface of the face cloud of points. At 920, as a validity check for this 3D point, we back-project it on the image frames that it was not triangulated from, and check its back projection is within the segmented face area. If it does, it is added to the cloud of points at 922.

The 2D points that were used to triangulate the 3D point are marked as used at 924, and this whole process is started again with the first valid unmarked pixel available at 928. The processing stops when there are no unmarked points left at 926.

Figure 9B:
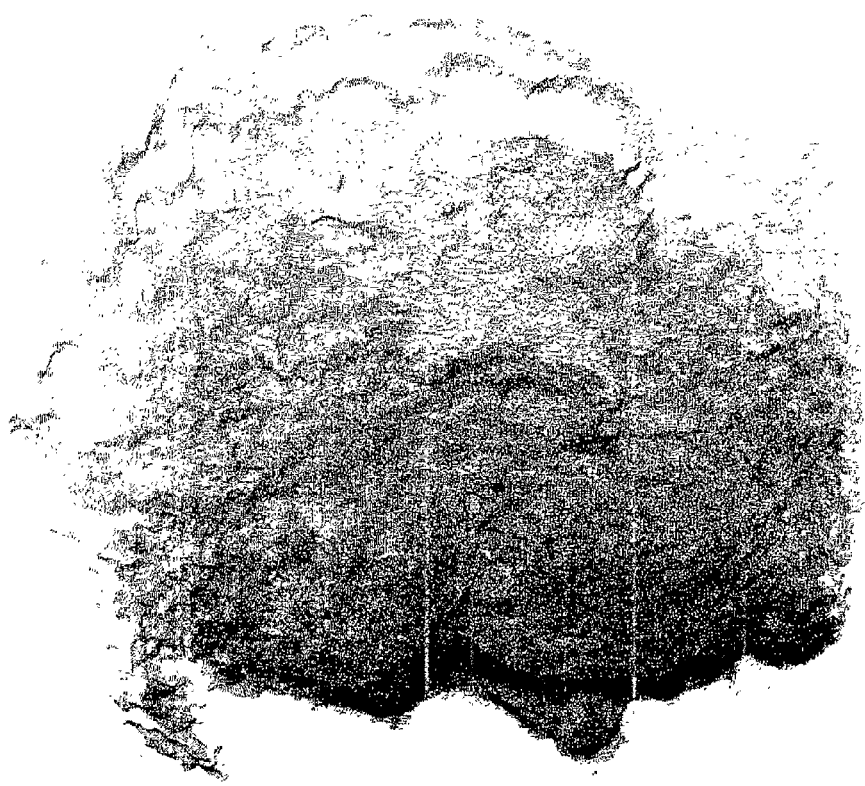
FIG. 9B shows a cloud of points representing the computed face surface.

After the end of the processing, a dense cloud of point is obtained (see FIG. 9B). This cloud of points represents the surface of the head. However, it has no topological information, and is usually thick due to dense stereo maps inherent noise.

Figure 10B:
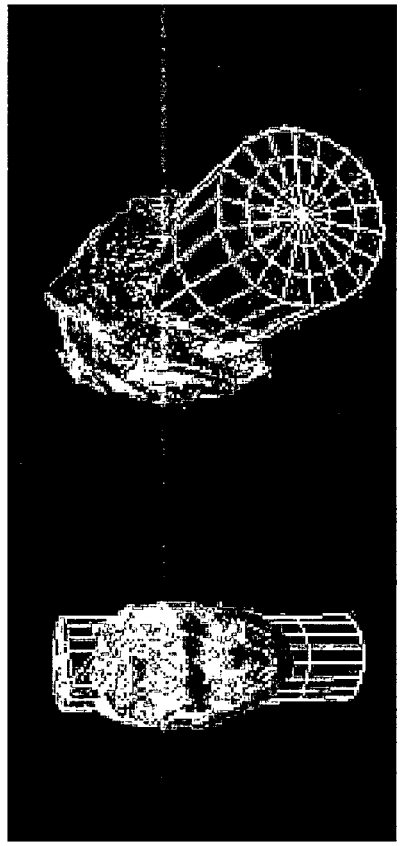
FIG. 10B shows the cylinder on which the face surface is projectable.
Figure 10A:
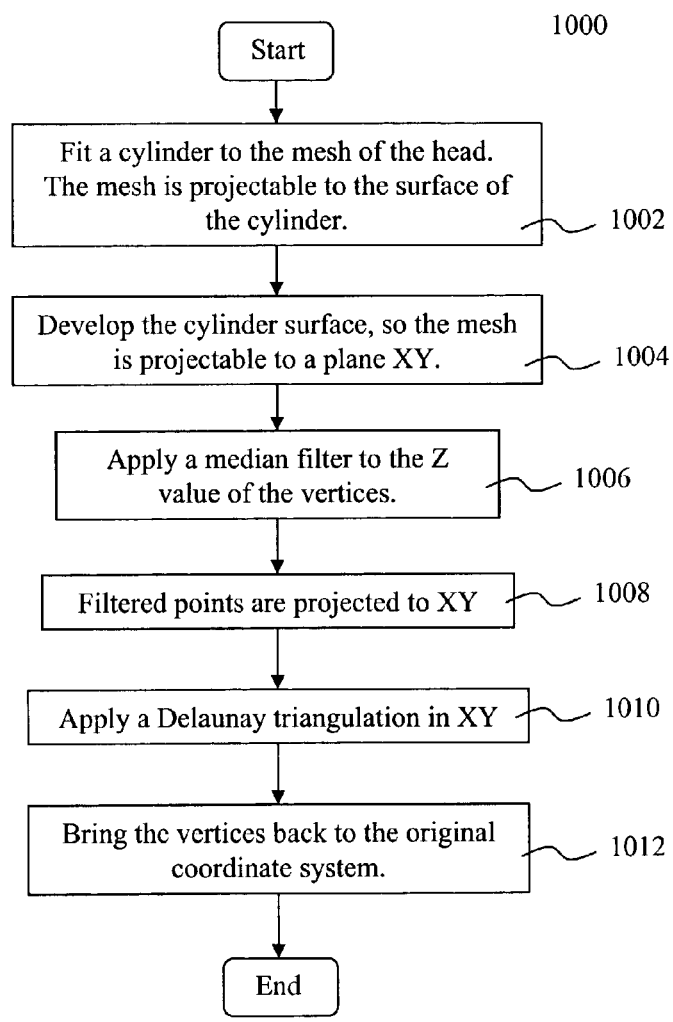
FIG. 10A shows a process flowchart of performing mesh triangulation.

FIG. 10A shows a process flowchart 1000 of performing mesh triangulation. The process 1000 may be used to implement block 142 of FIG. 1B. It may be observed that a human head is almost a star-shaped solid. It means that if one draws a line in 3D from the center of the head, it will intersect once and only once with its surface. This may not be exactly true, but at the level of detail in need, we can ignore the little concavities, for example, those present near the ears. We can even assume, without any significant quality loss, that the face has a surface that can be projected onto a cylinder. This cylinder is of vertical axis, going through the center of a head as shown in FIG. 10B.

Figure 10C:
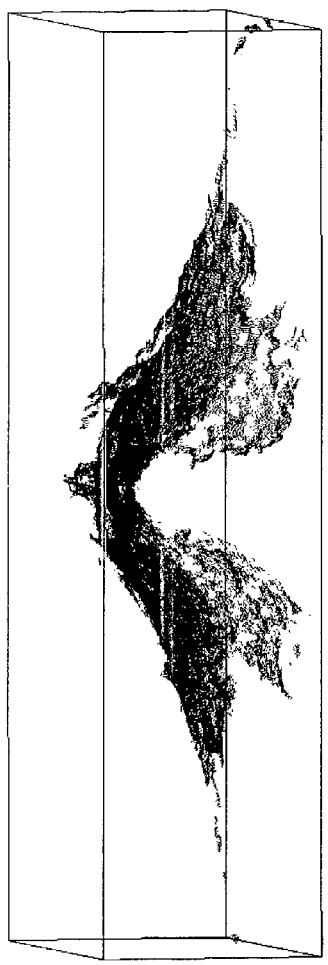
FIG. 10C shows the dense cloud of points representing the face surface in the developed cylinder coordinates system.
Figure 10D:
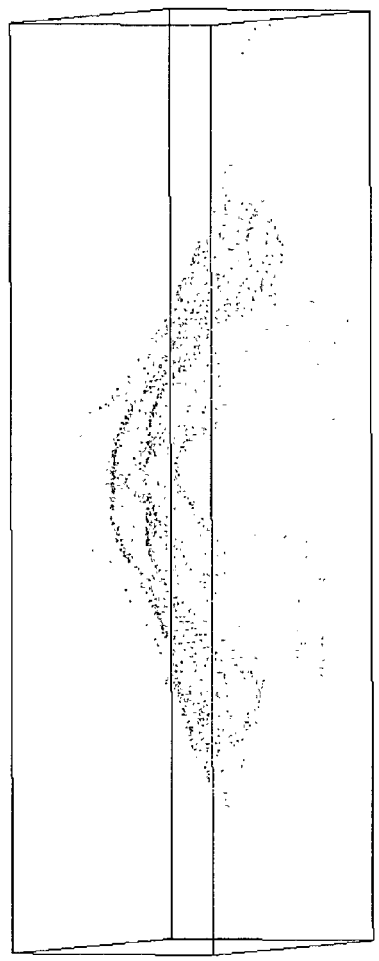
FIG. 10D shows the processed cloud of points representing the face surface in the developed cylinder coordinates system, ready to be triangulated.

Accordingly, at 1002, we find a suitable cylinder to be fit with the mesh of the head. In other words, the mesh is projectable to the surface of the cylinder. The cloud of points can thus be developed as a rectangular height map on a XY plane at 1004, for example. The Z coordinate represents the distance of the surface from the central axis of the cylinder as shown in FIG. 10C. The base rectangle on which the cloud can be projected is subdivided in buckets. Inside each bucket, the point with the median height is retained (e.g., via a median filter), and all the other points are discarded at 1006, as shown in FIG. 10D. Buckets containing only a few points or no points at all are simply rejected. At 1008, the filtered points are projected to XY and they can then be triangulated using the Delaunay method along the XY base plane at 1010. The vertices are then brought back to a Cartesian coordinate system at 1012, while the topological information is kept intact.

Figure 11A:
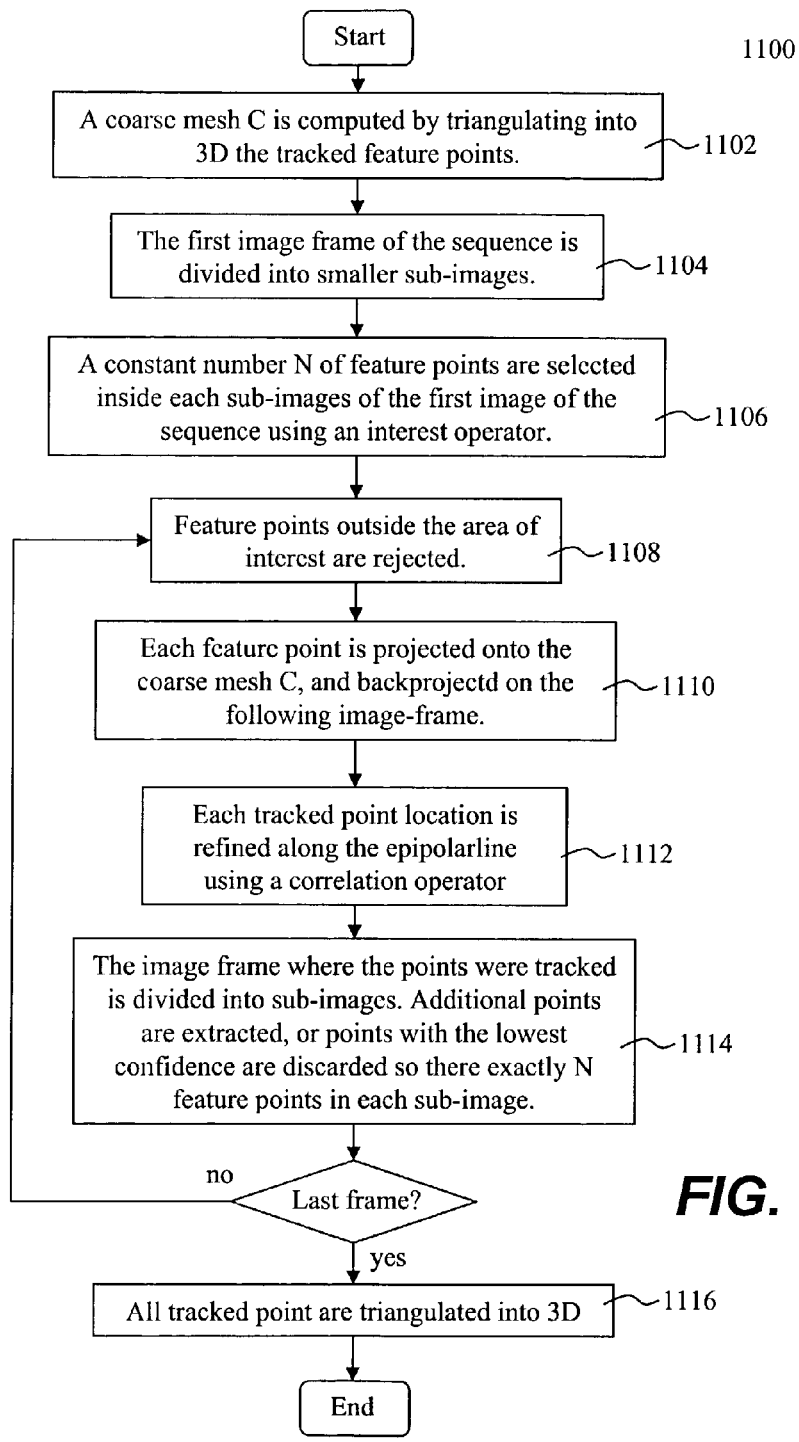
FIG. 11A shows a process flowchart of performing mesh triangulation.

FIG. 11A shows a process flowchart 1100 of performing mesh triangulation. The process 1100 may be used to implement the block 144 of FIG. 1B. It may be observed that the block 144 is an alternative to disparity computation (dense stereo maps computation 138, dense point cloud computation and mesh triangulation 142) and one of the purposes of the block 144 is to incrementally refine the points obtained from the Camera Pose Refinement 136 to create a mesh. Indeed, the 3D points used to adjust the camera positions are outlier free, as we have seen above. Therefore, they correspond to true features of the person's face in the 3D space.

Accordingly, these features are triangulated to produce a coarse mesh at 1102, covering most of the face area. Moreover, topological information is computed in the exact same way as in the mesh triangulation 142 or the process 1000. The mesh obtained is a relatively good approximation of the face surface. However, it is too sparse to be an acceptable final result. Nevertheless, it can be used to predict the corresponding feature in all the sequence for any point of the face, of any image, assuming that the point is inside the area covered by the coarse mesh.

At 1104, a first image frame is selected and divided into smaller sub-images. N feature points are selected in each of the subdivided images at 1106. Feature points extracted outside the segmented face area are rejected at 1108. For a pixel p in image frame I, the back projection on frame J of the intersection of a ray cast through pixel p is a good approximation of the correspondent of p in J at 1110. If the ray does not intersect with the face coarse mesh, it is intersected with the cylinder used to triangulate the mesh. The approximation is less accurate, but allow to extend the coverage of the mesh. Once the approximated location is known, the real correspondence is searched along the epipolar line using a correlation operator at 1112. At 1114, homogenous distribution of features in frame J is asserted in a similar way it was done at 512. The process is repeated until all newly tracked points are triangulated into 3D at 1116.

Figure 11C:
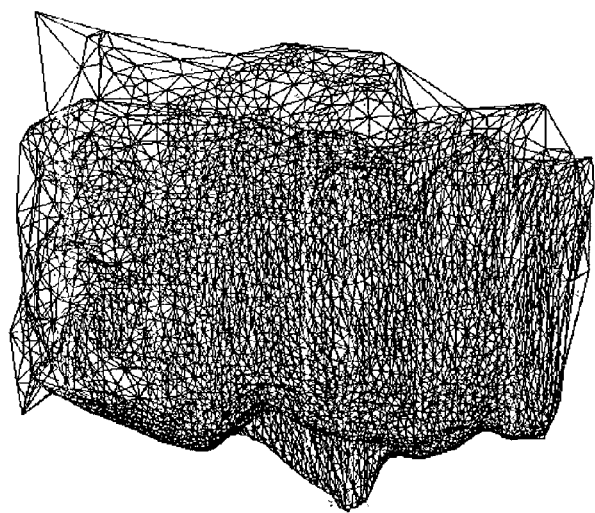
FIG. 11C shows the mesh of FIG. 11B after it is incrementally refined and extended.
Figure 11B:
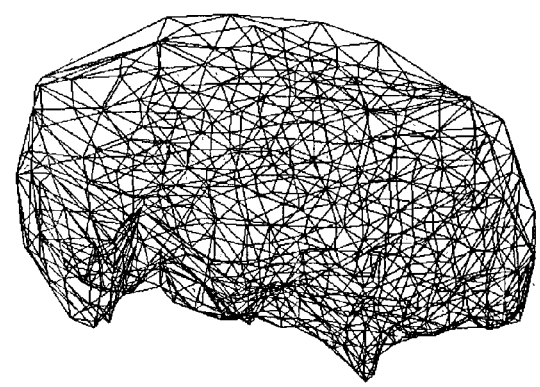
FIG. 11B shows a coarse mesh, the vertices of the mesh are directly triangulated from points tracked on the image frames.

Features are therefore tracked through the sequence, as described in Feature Tracking, with their location on the next frame predicted as described in this section. Initial features are whether extracted with the operator used during the Feature Tracking, or simply arbitrary added where needed. FIG. 11C shows a mesh obtained with this technique, after smoothing and decimation.

Figure 12A:
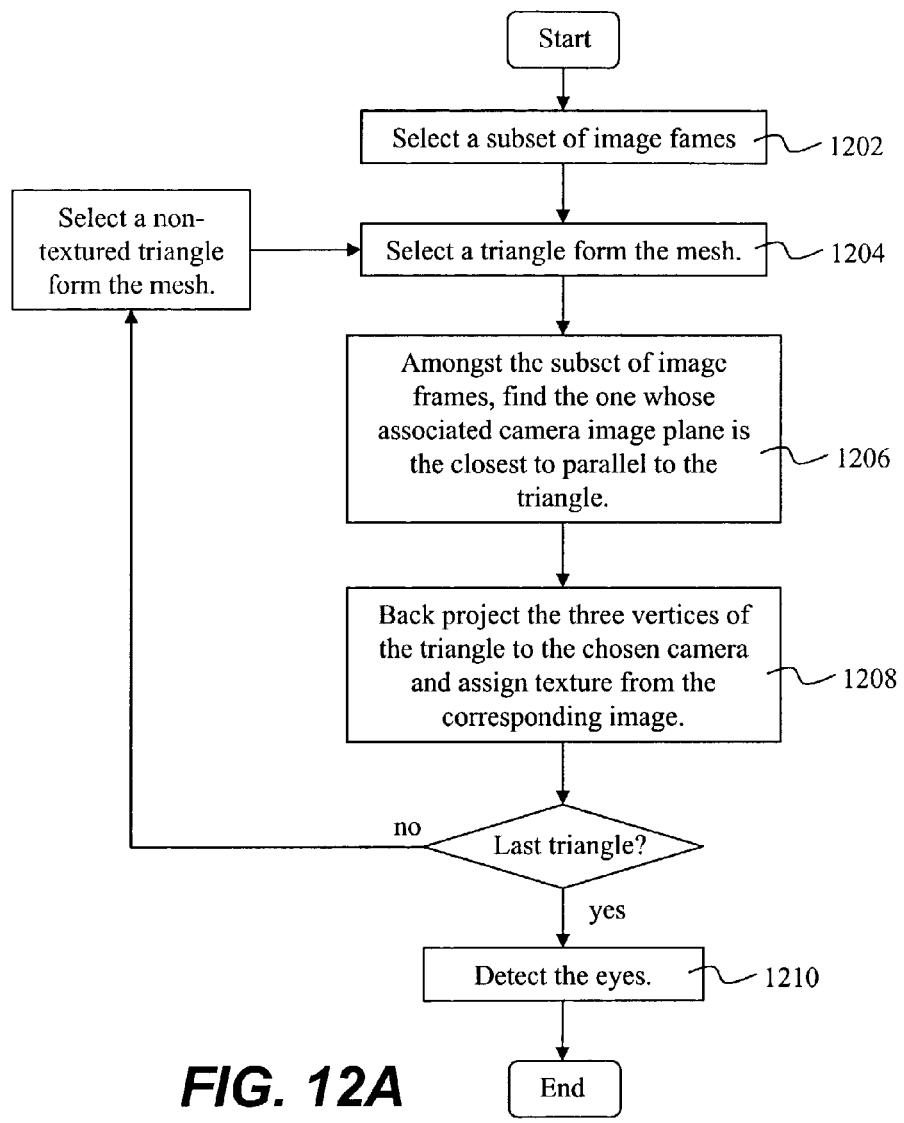
FIG. 12A shows a process flowchart of performing mesh texturing.
Figure 12C:
FIG. 12C shows a mesh of FIG. 12B after post-processing.
Figure 12B:
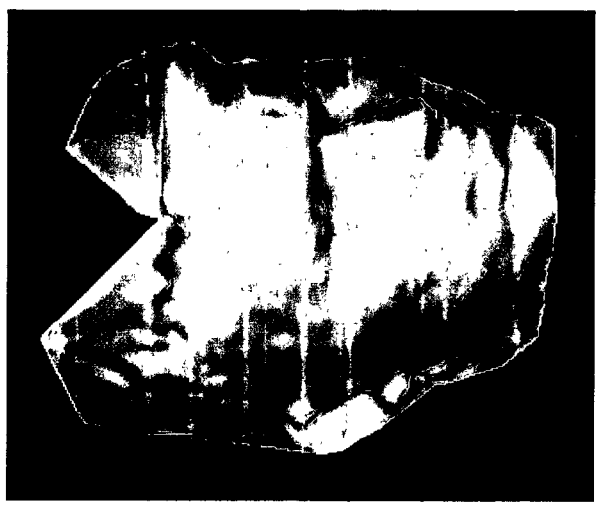
FIG. 12B shows a bumpy mesh as computed using dense stereo maps (e.g., from FIG. 8A, FIG. 9A, and FIG. 10A) or incremental computation (e.g. from FIG. 11A)

FIG. 12A shows a process flowchart 1200 of performing mesh texturing. The process 1200 may be used to implement the block 146 of FIG. 1B. One of the purposes of the process 1200 is to patch texture information on the refined mesh of the face. For each triangle of the mesh, an optimal image frame among a subset of image frames is selected at 1202. A triangle is selected from a mesh at 1204. At 1206, among the subset of image frames, the one whose associated camera image plane is the closest to parallel to the triangle is located.

The part of the image from this image corresponding to the triangle is projected onto the mesh, becoming the texture for that triangle at 1208. This technique solves the problem of the changing lightings of the moving face. Indeed, too connected triangles will usually be textured from cameras next to each others. This prevents abrupt changes of light. At 1210, the process goes on for a next triangle in the mesh till each of the triangles is textured.

Figure 12E:
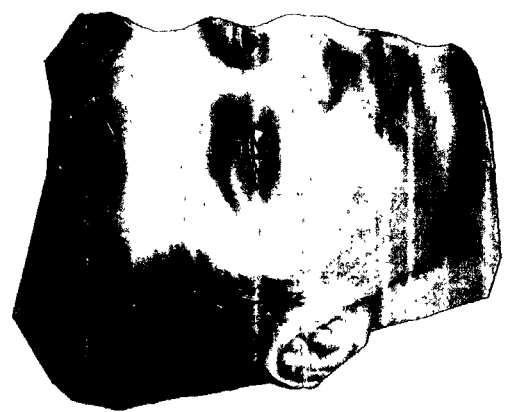
FIG. 12D & FIG. 12E show respectively a final result: a fully textured 3D model of a human face.
Figure 12D:
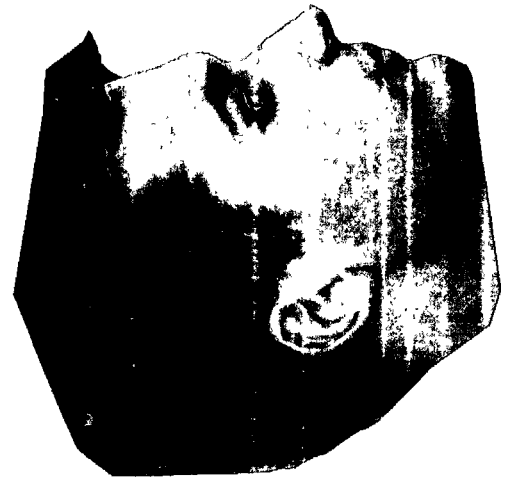

It is observed that there is a chance that the eyes might have moved between the shots of the two cameras. As a result, the two eyes will stare at different directions. To prevent this artifact, the positions of they eyes are detected at 1210, and they are textured from a single image in the sequence. FIGS. 12D and 12E represent show two views of a textured face.

The invention is preferably implemented by software or a combination of hardware and software, but can also be implemented in hardware. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

We claim:

1. A method for generating a fully-textured 3D model of a human face without depending on a deformable generic face, the method comprising:
   generating a sequence of images from a camera while the human face rotates from one direction to another direction in front of the camera;
   determining a foreground and a background in each of the image, the foreground occupied by the human face and thus changing from one to another in the sequence of the images;
   extracting features located in the foreground of each of the images;
   determining camera pose information in each of the images with respect to the features being tracked across the sequence of images;
   generating a 3D mesh model in accordance with the camera pose information; and
   texturing the 3D mesh model with respect to one or more of the images.

2. The method of claim 1 further comprising:
   rectifying the images in accordance with calibration information of the camera; and
   discarding some of the Images that demonstrate no motion of the human face with reference to an adjacent image thereof in the sequence of the images.

3. The method of claim 1, wherein the features are of sufficient number and largely distributed across the foreground; and the method further comprising:
   subdividing each of the images into a plurality of small regions;
   analyzing each of the regions for brightness and contrast information; and
   applying a filter to detect a pre-defined number of the features in the foreground.

4. The method of claim 3, wherein the features detected in one of the images are respectively confirmed with an adjacent image thereof.

5. The method of claim 4, wherein the features detected in one of the images are respectively matched in the adjacent image.

6. The method of claim 4, wherein the features detected In one of the Images are respectively tracked in the adjacent image.

7. The method of claim 4, wherein the determining of the camera pose information in each of the images comprises:
   computing, based on the confirmed features between the one of the images and the adjacent image thereof, the camera pose information with respect to the human face in each of the images; and
   refining the camera pose information using a non-linear bundle adjuster.

8. The method of claim 7 wherein the generating of the 3D mesh model in accordance with the camera pose information comprises:
   building dense stereo maps based on the pose information from each pair of two adjacent images in the sequence of the images,
   determining a respective dense disparity between the each pair of two adjacent images in accordance with the related features; and
   integrating the dense stereo maps into a 3D mesh by triangulation In reference to the respective dense disparity.

9. The method of claim 7, wherein the generating of the 3D mesh model in accordance with the camera pose information of the camera comprises:
   triangulating the confirmed features into a coarse mesh;
   adding incrementally the confirmed features and refining respective locations of the features in the images using the computed coarse mesh and the camera pose information; and
   triangulating the refined features to generate the 3D mesh model.

10. The method of claim 1, wherein the texturing of the 3D mesh model with respect to one or more of the images comprises:
    selecting a polygon In the 3D mesh model;
    determining one of the image frames whose associated camera plane is closest to that of the polygon; and
    assigning corresponding texture from the one of the image frames to the polygon.

11. A system for generating a fully-textured 3D model of a human face without depending on a deformable generic face, the system comprising:
    a computing device;

a single camera coupled to the computing device and
generating a sequence of Images while the human face
rotates from one direction to another direction before
the single camera; and wherein the computing device is configured to perform
operations of:
receiving the images from the camera;
determining camera pose information in each of the
images with respect to detected features being
tracked across the sequence of images;
generating a mesh model of the human face in accordance with the camera pose information; and
texturing each of polygons in the mesh model with
respect to one or more of the images.

12. The system of claim 11, wherein the determining of
the camera pose information in each of the images comprises:
determining a foreground and a background in each of the
image, the foreground occupied by the human face and
thus changing from one to another in the sequence of
the images
extracting the detected features located in the foreground
of each of the images;
confirming the features in one of the images with an
adjacent image thereof; and
computing the camera pose information using the confirmed features.

13. The system of claim 12, wherein the generating of the
mesh model of the human face comprises:
building dense stereo maps, based on the camera pose
information, from each pair of two adjacent images in
the sequence of the images,
determining a respective dense disparity between the each
pair of two adjacent images in accordance with the
confirmed features; and
integrating the dense stereo maps into the mesh model by
triangulation in reference to the respective dense disparity.

14. The system of claim 12, wherein the generating of the
mesh model of the human face comprises:
triangulating the confirmed features into a coarse mesh
incrementally adding the confirmed features and refining
respective locations of the confirmed features in the
images using the computed coarse mesh and the camera
pose information; and
triangulating the refined points to generate the mesh
model.

15. A software product encoded on a computer readable
medium and to be executed in a computing device for
generating a fully-textured 3D model of a human face
without depending on a deformable generic face, the software product comprising:
program code for receiving a sequence of images from a
camera, the image being produced while the human
face rotates from one direction to another direction in
front of the camera;
program code for determining a foreground and a background in each of the image, the foreground occupied
by the human face and thus changing from one to
another in the sequence of the images;
program code for extracting features located in the foreground of each of the images;
program code for determining pose information of the
camera in each of the images with respect to the
features being tracked across the sequence of images;
program code for generating a 3D mesh model in accordance with the camera pose information with respect to
the features; and
program code for texturing the 3D mesh model with
respect to one or more of the images.

16. The software product of claim 15 further comprising:
program code for rectifying the images in accordance
with calibration information of the camera; and
program code for discarding some of the images that
demonstrate no motion of the human face with reference to an adjacent image thereof in the sequence of the
images.

17. The software product of claim 15, wherein the features
are of sufficient number and largely distributed across the
foreground; and the software product further comprising:
program code for subdividing each of the images into a
plurality of small regions;
program code for analyzing each of the regions for
brightness and contrast information; and
program code for applying a filter to detect a pre-defined
number of the features in the foreground.

18. The software product of claim 17, wherein the features
detected in one of the images are respectively related to an
adjacent image thereof.

19. The software product of claim 18, wherein the program code for determining the camera pose information in
each of the images comprises:
program code for determining, based on the related features between the one of the images and the adjacent
image thereof, pose information of the human face with
respect to the camera In each of the images; and
program code for refining the camera pose information
using a non-linear bundle adjuster.

20. The software product of claim 19, wherein the program code for generating a 3D mesh model in accordance
with the camera pose information comprises:
program code for building dense stereo maps based on the
pose information;
program code for integrating the dense stereo maps into a
3D mesh by triangulation in reference to the respective
dense disparity.

21. The software product of claim 19, wherein the program code for generating a 3D mesh model in accordance
with the camera pose information comprises:
program code for refining Incrementally points obtained
from the camera pose information; and
program code for triangulating the refined points to generate the mesh model.

22. The software product of claim 15, wherein the program code for texturing the 3D mesh model with respect to
one or more of the images comprises:
program code for selecting a polygon in the mesh model;
program code for determining one of the images whose
associated camera plane is closest to that of the polygon; and
program code for assigning corresponding texture from
the image to the polygon.

* * * * *